(12) United States Patent
Mahoudeaux et al.

(10) Patent No.: US 8,443,949 B2
(45) Date of Patent: May 21, 2013

(54) MECHANICAL ACTUATOR CARTRIDGE FOR A MOTOR VEHICLE BRAKE

(75) Inventors: Roger Mahoudeaux, Le Blanc Mesnil (FR); Xavier Laurencin, Clermont Ferrand (FR)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 13/210,439

(22) Filed: Aug. 16, 2011

(65) Prior Publication Data
US 2012/0037470 A1 Feb. 16, 2012

(51) Int. Cl.
*B60T 11/10* (2006.01)

(52) U.S. Cl.
USPC ........ 188/368; 188/71.7; 188/71.9; 188/72.1; 188/72.7; 188/72.8; 188/72.9; 188/73.1; 74/89; 74/424.7; 74/425

(58) Field of Classification Search
USPC ............ 188/368, 71.7, 71.9, 72.1, 72.7, 72.8, 188/72.9, 73.1, 72.6, 196 P, 1.11 W, 218 XL, 188/196 A, 196 C, 196 R; 74/88, 89, 97.1
See application file for complete search history.

(56) References Cited

U.S. PATENT DOCUMENTS

| | | | | |
|---|---|---|---|---|
| 7,331,432 | B2 * | 2/2008 | Watada | 188/72.7 |
| 8,177,038 | B2 * | 5/2012 | Watada et al. | 188/72.8 |
| 8,302,741 | B2 * | 11/2012 | Chen et al. | 188/72.8 |
| 2005/0034935 | A1 * | 2/2005 | Maehara | 188/71.9 |

FOREIGN PATENT DOCUMENTS

IT TO20010681 1/2003

* cited by examiner

*Primary Examiner* — Robert A Siconolfi
*Assistant Examiner* — San Aung
(74) *Attorney, Agent, or Firm* — Michael Best & Friedrich LLP

(57) ABSTRACT

The cartridge (22) comprises a body (24), a rotary control plate (28) driving a push plate (30) in a translational movement, elastic means (38) of compressing the push plate (30) towards the control plate (28), and a cage (40) for holding the elastic means (38). The body (24) comprises a projection (42) for attaching the cage (40), collaborating with an attachment orifice (46) formed in an axial tab (44) of the cage (40). The cage (40) is capable of a rotational movement between an attachment position in which the attachment orifice (46) collaborates with the projection (42), and a release position in which the cage (40) is not attached to the body (24). The body (24) comprises a first limit stop (50) that limits the rotation of the cage (40) with which the tab (44) collaborates in the release position. The body (24) comprises a ramp (60), adjacent to the first limit stop (50). In the release position (40), the tab (44) rests radially against the projection (42) and the ramp (60).

19 Claims, 2 Drawing Sheets

MECHANICAL ACTUATOR CARTRIDGE FOR A MOTOR VEHICLE BRAKE

BACKGROUND OF THE INVENTION

The present invention relates to motor vehicle braking devices, particularly devices comprising a mechanical hand brake actuator.

Such a braking device comprises in the conventional way a hydraulic ram intended to press a brake pad firmly against a brake disc incapable of rotating independently of a wheel of the vehicle. The hydraulic ram comprises a ram cylinder and a ram piston capable of sliding in the cylinder.

Usually, the translational movement of the ram piston is brought about by rotary control means, via means that convert the rotational movement of these control means into a translational movement of the piston. These conversion means are carried by a mechanical actuator cartridge for a brake, which cartridge is intended to be positioned in the ram cylinder between the rotary control means and the piston.

Thus, the prior art, particularly ITTO 2001 0681 (A1), discloses a cartridge of the type comprising:
- a cartridge body with an overall shape exhibiting symmetry of revolution about an axis, incapable of rotating independently of the cylinder,
- a control shaft, housed in the cartridge body, on the one hand incapable of rotating independently of a rotary control plate and, on the other hand, intended to rotate as one with the rotary control means,
- a push plate, housed in the cartridge body, collaborating, on the one hand, with the control plate via means that convert the rotational movement of the control plate into a translational movement of the push plate, and on the other hand intended to collaborate with the ram piston to drive the translational movement of this ram piston,
- elastic means of compressing the push plate towards the control plate,
- a cage for holding the elastic means, the elastic means extending between a first seat borne by the cage and a second seat borne by the push plate, in which:
- the cartridge body comprises at least one projection for attaching the cage to the body, and the cage comprises at least one axial tab comprising an attachment orifice capable of collaborating with the attachment projection to attach this cage to the cartridge body,
- the cage is capable of rotational movement about the axis of the cartridge body, between an attachment position in which the attachment orifice collaborates with the attachment projection, and a release position in which the cage is released from the body,
- the cartridge body comprises at least one first circumferential limit stop for limiting the rotation of the cage, the axial tab of the cage being capable of collaborating with the first limit stop when the cage is in its release position.

When the cartridge is being stored or being mounted in the cylinder, the elastic compression means are held in the cartridge by the cage, which is attached to the cartridge body.

When the cartridge is inserted in the cylinder, the cage is turned from its position of attachment to the body to its position of being released from this body. During this change in position, the axial tab is deformed by a slight radial movement as it rises up to rest against the attachment projection.

This axial tab is usually provided with a hook, intended to collaborate with an opening, for example a peripheral slot formed in the ram cylinder. Thus, when the axial tab is resting against the attachment projection, the hook collaborates with the corresponding opening so that the cage is attached to the cylinder.

It will be noted that when the cage is attached to the cylinder, the tab rests against a surface of reduced surface area, consisting of the attachment projection, which is of a small size. Thus, there is a risk that the tab will become detached or deformed, leading to premature cage wear.

SUMMARY OF THE INVENTION

It is a notable object of the invention to improve the reliability of such a cartridge without altering the overall dimensions of the cartridge, as these are dictated by its environment.

To this end, one subject of the invention is a mechanical actuator cartridge for a brake of the aforementioned type, in which the cartridge body comprises a ramp-forming projection, adjacent to the first limit stop, such that when the cage is in the release position, the axial tab bears radially both against the attachment projection and against the ramp.

Thanks to this ramp-forming projection, the axial tab rests against two bearing surfaces (the attachment projection and the ramp) rather than just one when the cage is in its release position. Thus, in this release position, the axial tab is more stable, and does not run the risk of becoming inadvertently detached from the cylinder when the cartridge is inserted into this cylinder.

Further, because this projection is adjacent to the first limit stop, it reinforces this first limit stop, allowing it to withstand greater loadings than a limit stop of a conventional cartridge.

A mechanical actuator cartridge for a brake according to the invention may further comprise one or more of the following features:
- The cartridge body comprises at least a second circumferential limit stop that limits the rotation of the cage towards its attachment position. Such a limit stop prevents the cage from rotating in the direction opposite to the rotation towards its release position.
- The cartridge body comprises at least one radial projection circumferentially delimited by the first and second circumferential limit stops.
- The radial projection of the cartridge body comprises an axial notch intended to collaborate with a complementary axial relief belonging to the push plate such that the cartridge body and the push plate cannot rotate independently of each other.
- With the axial notch being circumferentially delimited by first and second walls, the circumferential distance between the first wall and the first limit stop is less than the circumferential distance between the second wall and the second limit stop. The second limit stop is therefore particularly well reinforced to withstand load.
- The cartridge body is forged.
- The attachment projection is delimited circumferentially by, on the one hand, a ramp that collaborates with the axial tab of the cage when this cage is moved in an angular fashion towards its release position and, on the other hand, a step forming a limit stop intended to collaborate with the axial tab so as to prevent an angular movement that is the opposite of the angular movement towards its release position.
- The means of converting the rotational movement of the control plate into a translational movement of the push plate comprise a first circumferential groove formed in the control plate, forming a circumferential ramp, a second circumferential groove formed in the push plate, and at least one ball housed between the first and second circumferential grooves.

Another subject of the invention is a motor vehicle braking device, of the type comprising:
- a motor vehicle brake hydraulic ram comprising a ram cylinder and a ram piston,
- a mechanical actuator cartridge as defined hereinabove, the cartridge being housed in the cylinder in such a way that the cartridge body is incapable of rotational movement independently of the cylinder and that the push plate collaborates with the ram piston in such a way that it can drive the translational movement of this ram piston.

For preference, the axial tab of the cage of the actuator cartridge comprises a hook capable of collaborating with an opening formed in the ram cylinder so as to hold the cage on the cylinder when it is in its release position.

For preference also, the push plate is secured to a first connecting member forming a nut, intended to collaborate with a complementary second connecting member forming a screw, secured to the ram piston.

BRIEF DESCRIPTION OF THE DRAWINGS

The invention will be better understood from reading the description which will follow, which is given solely by way of example and made with reference to the attached drawings in which.

DETAILED DESCRIPTION

Figure 1:
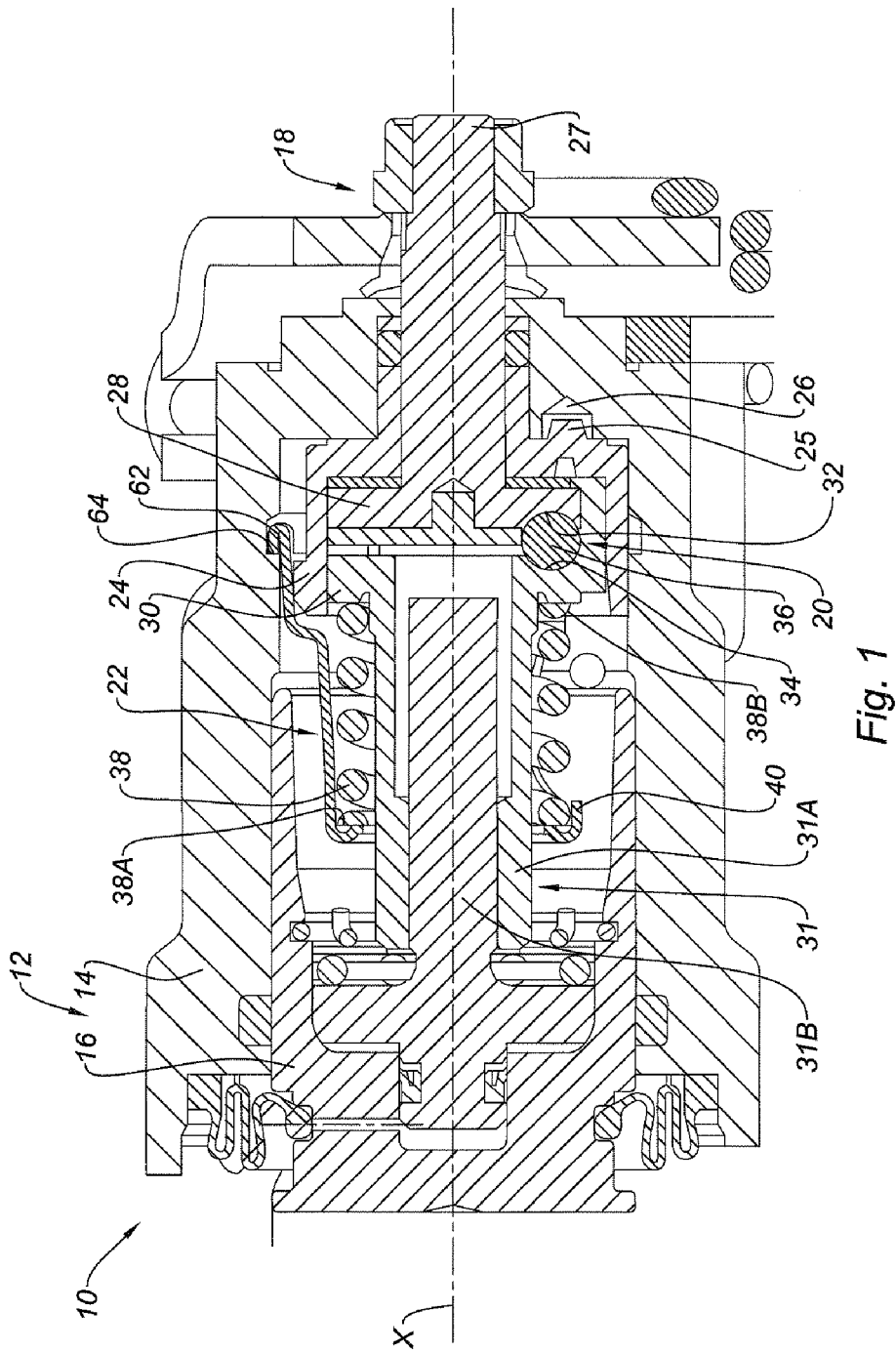
FIG. 1 is a view in axial section of a braking device according to one exemplary embodiment of the invention.

FIG. 1 depicts a motor vehicle braking device 10 according to one exemplary embodiment of the invention.

The braking device 10 comprises a hydraulic ram 12 intended to press a brake pad against a brake disc incapable of rotating independently of a wheel of the vehicle. The ram 12 comprises a ram cylinder 14 and a ram piston 16 intended to slide in the cylinder 14, these generally exhibiting symmetry of revolution about an axis X.

The ram piston 16 is made to effect a translational movement by rotary control means 18, by means 20 of converting the rotational movement of these control means 18 into a translational movement of the piston 16. These conversion means 20 are carried by a mechanical actuator cartridge 22 of a brake, arranged in the ram cylinder 14 between the rotary control means 18 and the piston 16.

The cartridge 22 comprises a cartridge body 24 with overall symmetry of revolution about the axis X. For preference, this cartridge body 24 is manufactured by forging.

This body 24 comprises at least one stud 25, intended to collaborate with a complementary orifice 26 formed in the cylinder 14 so as to secure the body 24 to the cylinder 14 when the cartridge 22 is inserted in the cylinder 14.

The cartridge 22 also comprises a control shaft 27, intended to rotate as one with the rotary control means 18, housed in part in the cartridge body 24. This control shaft 27 also rotates as one with a rotary control plate 28 housed in the body 24. For example, the control shaft 27 and the rotary control plate 28 are formed as one piece.

The cartridge 22 further comprises a push plate 30, incapable of translational movement along the axis X independently of the piston 16.

For preference, the push plate 30 is connected to the piston 16 by means 31 for compensating for brake pad wear. These wear compensation means 31 comprise a first member 31A forming an elongate nut, secured to the push plate 30, for example formed as one piece with this push plate 30, and a second member 31B forming a screw, collaborating with the nut 31A, secured to the piston 16. The wear compensation means 31 therefore have a length that can vary depending on the extent to which the screw 31B is screwed into the nut 31A, thus making it possible to lengthen the distance between the push plate 30 and the piston 16 according to the degree of brake pad wear.

In order to be driven in a translational movement in the direction of the axis X, the push plate 30 collaborates with the control plate 28 via means 20 of converting the rotational movement of the control plate 28 into a translational movement of the push plate 30.

The conversion means 20 comprise a first circumferential groove 32 formed in the control plate 28, and a second circumferential groove 34 formed in the push plate 30 facing the first circumferential groove 32. The conversion means 20 also comprise at least one, and preferably a plurality of, ball bearings 36 housed between the first 32 and second 34 circumferential grooves.

At least one of the first 32 and second 34 circumferential grooves forms a circumferential ramp. Because of this circumferential ramp, when the control plate 28 begins to rotate, driven by the rotary control means 18, each ball 36 rolls in the first 32 and second 34 grooves along the circumferential ramp so that the push plate 30 is moved in a translational movement in the direction of the axis X.

In order to keep each ball 36 between the first 32 and second 34 grooves, the cartridge 22 comprises elastic means 38 of compressing the push plate 30 towards the control plate 28, these means for example comprising a compression spring.

These elastic means 38 are held in the cartridge 22 by a cage 40 that retains these elastic means 38. Thus the elastic means 38 extend between a first seat 38A borne by the cage 40 and a second seat 38B borne by the push plate 30.

The cartridge body 24 and the cage 40 are depicted in greater detail in FIGS. 2 to 5.

The cartridge body 24 comprises at least one, preferably three, attachment projections 42 for attaching the cage 40 to the body 24. The cage 40 comprises at least one, and preferably three, axial tabs 44, comprising an attachment orifice 46 intended to collaborate with the corresponding attachment projection 42 to attach this cage 40 to the cartridge body 24 as has been depicted in FIG. 4. Each tab 44 is elastically deformable in the radial direction.

Figure 2:
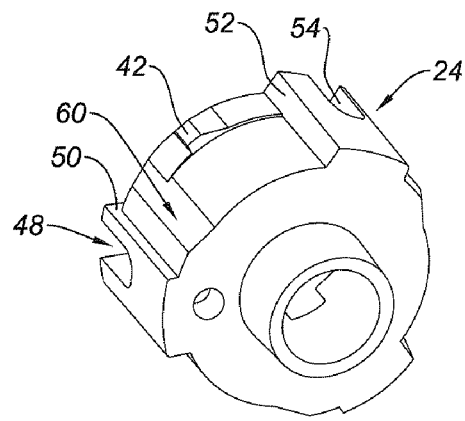
FIGS. 2 and 3 are views, in perspective and in cross section respectively, of a cartridge body with which the braking device of FIG. 1 is equipped.
Figure 3:
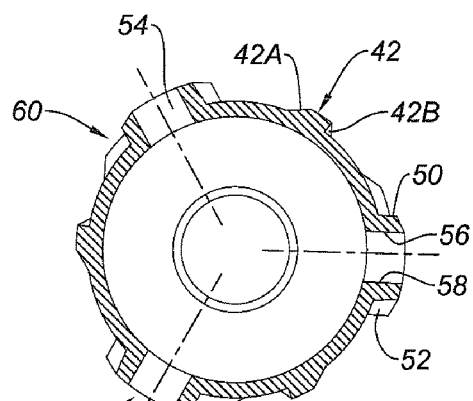
Figure 4:
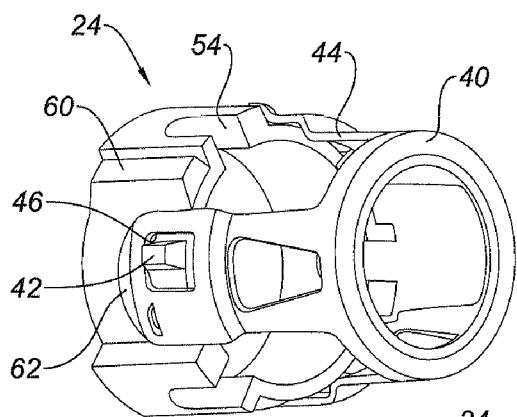
FIGS. 4 and 5 are perspective views of the cartridge body of FIGS. 2 and 3 and of a cartridge cage, in the positions in which the cage is attached and released, respectively.

As has been depicted in FIGS. 2 and 3, each attachment projection 42 is circumferentially delimited by, on the one hand, a ramp 42A and, on the other hand, a step 42B.

Thus, each attachment projection 42 allows the cage 40 to rotate in a first direction, in which the corresponding axial tab 44 collaborates with the ramp 42A, and prevents the cage 40 from rotating in a second direction which is opposite to the first, in which the step 42B form a limit stop, collaborating with the axial tab 44.

Specifically, the cage 40 is able to rotate about the axis X between an attachment position (depicted in FIG. 4) in which each attachment orifice 46 collaborates with the corresponding attachment projection 42, and a release position (depicted in FIG. 5) in which the cage 40 is not attached to the body 24.

It will be noted that the cartridge body 24 comprises at least one, and preferably three, radial projections 48 circumferentially delimited by first 50 and second 52 circumferential limit stops that limit the rotation of the cage 40.

Each axial tab 44 of the cage 40 is capable of collaborating with the corresponding first limit stop 50 when the cage 40 is in its release position and with the corresponding second limit stop 52 when the cage is in its attachment position. Thus, the second limit stop 52 is intended to collaborate with the corresponding axial tab 44 to prevent a rotation which is opposite to the rotation towards the position of release of the cage 40.

It will be noted that each radial projection 48 of the body 24 comprises an axial notch 54 intended to collaborate with a complementary axial relief of the push plate 30 so as to prevent this cartridge body 24 from being able to rotate independently of this push plate 30.

The axial notch 54 is circumferentially delimited by first 56 and second 58 walls, the circumferential distance between the first wall 56 and the first limit stop 50 being less than the circumferential distance between the second wall 58 and the second limit stop 52. In other words, the second limit stop 52 is all the more reinforced than the first limit stop 50, and is therefore able to withstand greater loadings.

The cartridge body 24 also comprises at least one, and preferably three, ramp-forming projections 60 adjacent to the first limit stop 50. In addition to reinforcing the first limit stop 50, this ramp 60 forms a radial support for the corresponding axial tab 44 when the cage 40 is in its release position.

Figure 5:
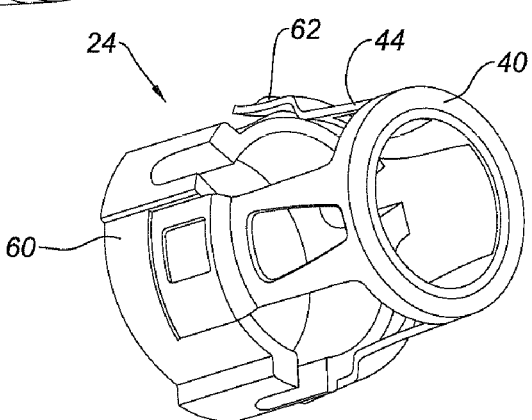

Thus, in this release position of the cage 40 each axial tab 44 rests radially both against the corresponding attachment projection 42 and against the corresponding ramp 60, as has been depicted in FIG. 5. This axial tab 44, resting radially against two bearing surfaces, is therefore more stable than if it were resting against only the attachment projection 42.

It will be noted that each axial tab 44 is equipped with a hook 62, intended to collaborate with an opening 64, for example a peripheral slot, formed on the cylinder 14 of the ram 12, so as to hold the cage 40 on the cylinder 14 when the cage is in its release position.

Specifically, when the cage 40 is in its release position, each tab 44 rests radially against the corresponding attachment projection 42 and the corresponding ramp 60, and is thus radially offset with respect to the position it occupies when the cage 40 is in the attachment position. It is when this tab 44 is thus radially offset that the hook 62 collaborates with the corresponding opening 64.

During storage or mounting, the cage 40 is held on the cartridge body 24 by the attachment projections 42. When the cartridge 22 is inserted in the ram cylinder 14, the cage 40 is turned as far as its release position, in which it is no longer attached to the cartridge body 24 but is attached to the cylinder 14.

Thus, in the release position, the elastic forces generated by the elastic means 38 are transferred to the cylinder 14, firstly via hooks 62 and secondly via the stack made up of the push plate 30, the control plate 28 and the cartridge body 24.

The cartridge 22 thus remains attached to the cylinder 14 in a simple, reliable and effective way.

Finally, it will be noted that the invention is not restricted to the embodiment described hereinabove and that it can be modified without departing from the scope of the claims.

LIST OF REFERENCES

10: Braking device
12: Hydraulic ram
14: Cylinder of the ram 12
16: Piston of the ram 12
18: Rotary control means
20: Means of converting a rotational movement into a translational movement
22: Mechanical actuator cartridge for a motor vehicles brake
24: Body of the cartridge 22
25: Stud that prevents the body 24 from rotating independently of the cylinder 14
26: Orifice that prevents the body 24 from rotating independently of the cylinder 14 and that collaborates with the stud 25
27: Control shaft
28: Control plate
30: Push plate
31: Brake pad wear compensating means
31A: First wear compensating member forming an elongate nut
31B: Second wear compensating member forming a screw
32: First circumferential groove formed in the control plate 28
34: Second circumferential groove 34 formed in the push plate 30
36: Ball bearing
38: Compression elastic means
38A, 38B: First and second seat of the elastic means
40: Cage
42: Attachment projection
42A: Ramp of the projection 42
42B: Step of the projection 42
44: Axial tab
46: Attachment opening
48: Radial projection
50: First circumferential limit stop
52: Second circumferential limit stop
54: Axial notch
56, 58: First and second walls of the axial notch
60: Ramp-forming projection
62: Hook
64: Peripheral slot

The invention claimed is:

1. A mechanical actuator cartridge (22) for a motor vehicle brake, comprising:
   a cartridge body (24) with an overall shape exhibiting symmetry of revolution about an axis (X),
   a rotary control plate (28), housed in the cartridge body (24),
   a push plate (30), housed in the cartridge body (24), collaborating with the control plate (28) via means (20) that convert the rotational movement of the control plate (28) into a translational movement of the push plate (30),
   elastic means (38) of compressing the push plate (30) towards the control plate (28), and
   a cage (40) for holding the elastic means (38), the elastic means (38) extending between a first seat (38A) borne by the cage (40) and a second seat (38B) borne by the push plate (30),
in which:
   the cartridge body (24) comprises at least one projection (42) for attaching the cage (40) to the body (24), and the cage (40) comprises at least one axial tab (44) comprising an attachment orifice (46) capable of collaborating with the attachment projection (42) to attach this cage (40) to the cartridge body (24),
   the cage (40) is capable of rotational movement about the axis (X) of the cartridge body (24), between an attachment position in which the attachment orifice (46) collaborates with the attachment projection (42), and a release position in which the cage (40) is released from the body (24), and the cartridge body (24) comprising at least one first circumferential limit stop (50) for limiting the rotation of the cage (40), the axial tab (44) of the cage (40) being capable of collaborating with the first limit stop (50) when the cage (40) is in its release position, characterized in that the cartridge body (24) comprises a ramp-forming projection (60), adjacent to the first limit stop (50), such that when the cage (40) is in the release position, the axial tab (44) rests radially both against the attachment projection (42) and against the ramp-forming projection (60).

2. The mechanical actuator cartridge (22) for a brake according to claim 1, in which the cartridge body (24) comprises at least one radial projection (48) circumferentially delimited by the first circumferential limit stop (50) and also delimited by a second circumferential limit stop (52) that limits the rotation of the cage (40) towards its attachment position.

3. The mechanical actuator cartridge (22) for a brake according to claim 2, in which the radial projection (48) of the cartridge body (24) comprises an axial notch (54) intended to collaborate with a complementary axial relief belonging to the push plate (30) such that the cartridge body (24) and the push plate (30) cannot rotate independently of each other.

4. The mechanical actuator cartridge (22) for a brake according to claim 3, in which, with the axial notch (54) circumferentially being delimited by first (56) and second (58) walls, the circumferential distance between the first wall (56) and the first limit stop (50) is less than the circumferential distance between the second wall (58) and the second limit stop (52).

5. The mechanical actuator cartridge (22) for a brake according to claim 1, in which the cartridge body (24) is forged.

6. The mechanical actuator cartridge (22) for a brake according to claim 1, in which the attachment projection (42) is delimited circumferentially by, on the one hand, a ramp (42A) that collaborates with the axial tab (44) of the cage (40) when the cage (40) is rotating towards its release position and, on the other hand, a step (42B) forming a limit stop intended to collaborate with the axial tab (44) so as to prevent a rotation which is opposite to the rotation towards the released position of the cage (40).

7. The mechanical actuator cartridge (22) for a brake according to claim 1, in which the means (20) of converting the rotational movement of the control plate (28) into a translational movement of the control plate (30) comprise a first circumferential groove (32) formed in the control plate (28), a second circumferential groove (34) formed in the push plate (30) facing the first circumferential groove (32), and at least one ball (36) housed between the first (32) and second (34) circumferential grooves, at least one of the first (32) and second (34) circumferential grooves forming a circumferential ramp.

8. A motor vehicle braking device (10) comprising:
a motor vehicle brake hydraulic ram (12) comprising a ram cylinder (14) and a ram piston (16), and
a mechanical actuator cartridge (22) according to claim 1, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

9. A motor vehicle braking device (10) according to claim 8, in which the axial tab (44) of the cage (40) of the actuator cartridge (22) comprises a hook (62) capable of collaborating with an opening (64) formed in the ram cylinder (14) so as to hold the cage (40) in the cylinder (14) when it is in its release position.

10. A motor vehicle braking device (10) according to claim 8, in which the push plate (30) is secured to a first connecting member forming a nut (31A), intended to collaborate with a complementary second connecting member forming a screw (31B), secured to the ram piston (16).

11. The mechanical actuator cartridge (22) for a brake according to claim 4, in which the cartridge body (24) is forged.

12. The mechanical actuator cartridge (22) for a brake according to claim 11, in which the attachment projection (42) is delimited circumferentially by, on the one hand, a ramp (42A) that collaborates with the axial tab (44) of the cage (40) when the cage (40) is rotating towards its release position and, on the other hand, a step (42B) forming a limit stop intended to collaborate with the axial tab (44) so as to prevent a rotation which is opposite to the rotation towards the released position of the cage (40).

13. The mechanical actuator cartridge (22) for a brake according to claim 12, in which the means (20) of converting the rotational movement of the control plate (28) into a translational movement of the control plate (30) comprise a first circumferential groove (32) formed in the control plate (28), a second circumferential groove (34) formed in the push plate (30) facing the first circumferential groove (32), and at least one ball (36) housed between the first (32) and second (34) circumferential grooves, at least one of the first (32) and second (34) circumferential grooves forming a circumferential ramp.

14. A motor vehicle braking device (10) comprising:
a motor vehicle brake hydraulic ram (12) comprising a ram cylinder (14) and a ram piston (16), and
a mechanical actuator cartridge (22) according to claim 2, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

15. A motor vehicle braking device (10) comprising:
a motor vehicle brake hydraulic ram (12) comprising a ram cylinder (14) and a ram piston (16), and
a mechanical actuator cartridge (22) according to claim 3, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

16. A motor vehicle braking device (10) comprising:
a motor vehicle brake hydraulic ram (12) comprising a ram cylinder (14) and a ram piston (16), and
a mechanical actuator cartridge (22) according to claim 4, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

17. A motor vehicle braking device (10) comprising:
a motor vehicle brake hydraulic ram (12) comprising a ram cylinder (14) and a ram piston (16), and a mechanical actuator cartridge (22) according to claim 5, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

18. A motor vehicle braking device (10) comprising:
a motor vehicle brake hydraulic ram (12) comprising a ram cylinder (14) and a ram piston (16), and
a mechanical actuator cartridge (22) according to claim 6, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

19. A motor vehicle braking device (10) comprising:
a motor vehicle brake hydraulic ram (12) comprising a ram cylinder (14) and a ram piston (16), and
a mechanical actuator cartridge (22) according to claim 7, the cartridge (22) being housed in the cylinder (14) in such a way that the cartridge body (24) is incapable of rotational movement independently of the cylinder (14) and that the push plate (30) collaborates with the ram piston (16) in such a way that it can drive the translational movement of this ram piston (16).

\* \* \* \* \*